(12) United States Patent
Berger

(10) Patent No.: US 7,371,026 B2
(45) Date of Patent: May 13, 2008

(54) DEVICE FOR TEACHING PROPER PENMANSHIP TECHNIQUE

(75) Inventor: Debra E. Berger, Union, KY (US)

(73) Assignee: Debra Eileen Berger, Union, KY (US)

( * ) Notice: Subject to any disclaimer, the term of this patent is extended or adjusted under 35 U.S.C. 154(b) by 588 days.

(21) Appl. No.: 11/093,579

(22) Filed: Mar. 30, 2005

(65) Prior Publication Data

US 2006/0246404 A1    Nov. 2, 2006

(51) Int. Cl.
*A46B 5/02* (2006.01)
(52) U.S. Cl. .......................................................... 401/8
(58) Field of Classification Search ................. 401/6–8
See application file for complete search history.

(56) References Cited

U.S. PATENT DOCUMENTS

| 371,814 A | * | 10/1887 | Bearce | 15/437 |
| 5,722,575 A | * | 3/1998 | Smith | 224/217 |

* cited by examiner

*Primary Examiner*—Huyen Le

(57) ABSTRACT

A device for teaching proper penmanship by assisting the user in holding the writing implement in the correct orientation. A first component is attached to the user's middle finger while a second component encircles the implement. A section of the second component is releasably attached to the first component, holding the fingers in proper position for writing.

16 Claims, 2 Drawing Sheets

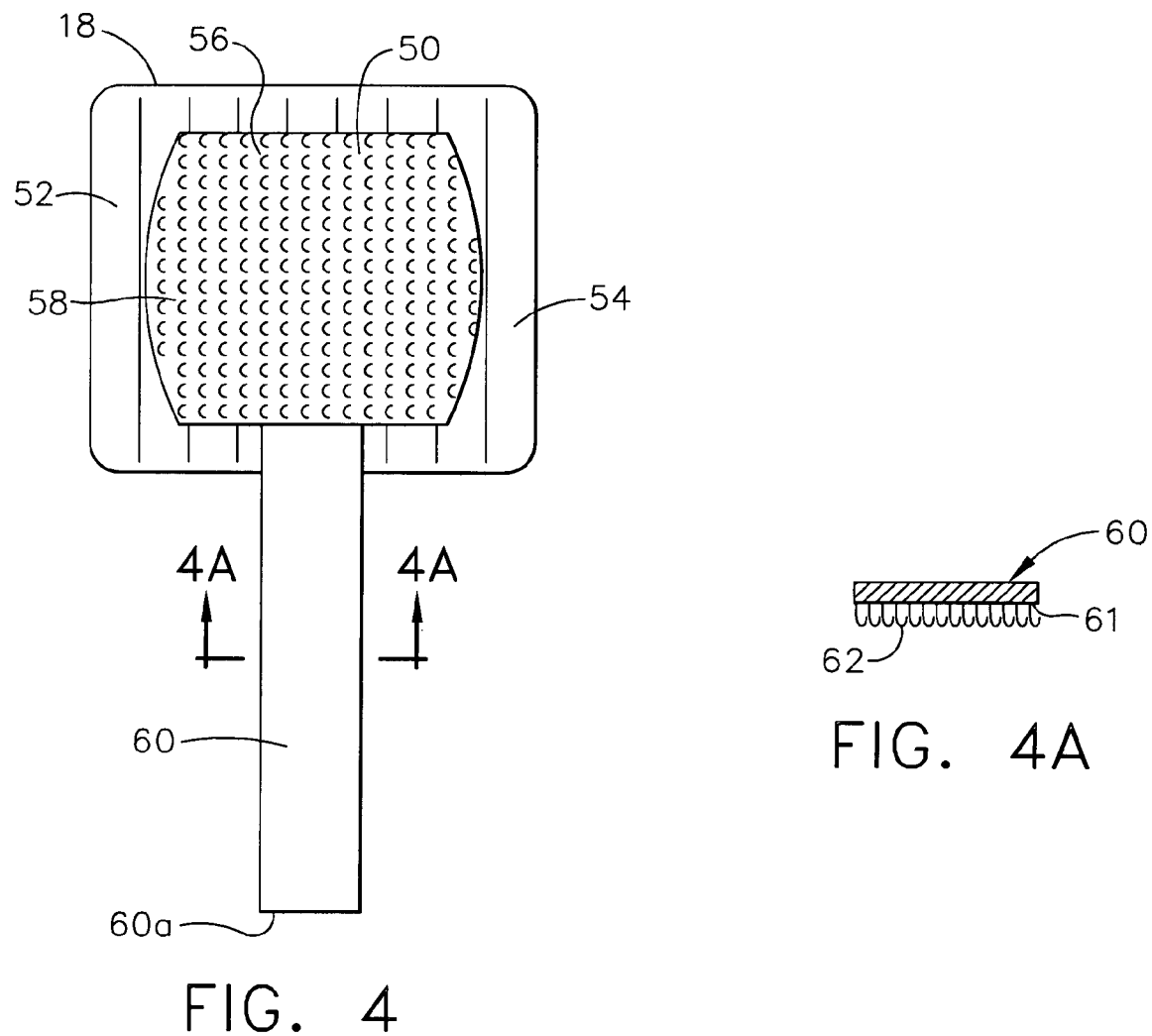
FIG. 4
FIG. 4A
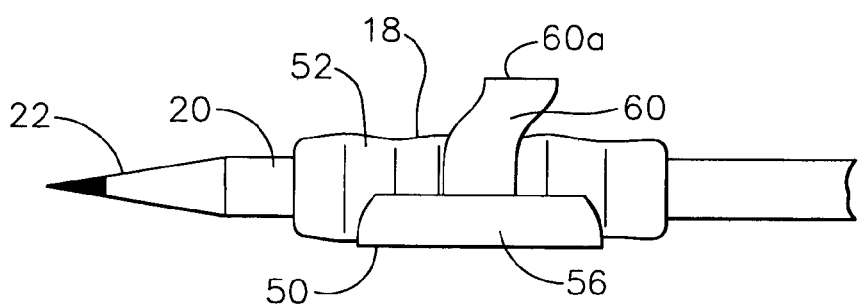
FIG. 5

DEVICE FOR TEACHING PROPER PENMANSHIP TECHNIQUE

BACKGROUND OF THE INVENTION

1. Field of the Invention

The present invention is directed in general to penmanship techniques, and, in particular, to a device which facilitates the proper gripping of a writing instrument.

2. Description of the Related Art

In today's society, it is important to learn at an early age the proper gripping of a pencil or pen when writing, as legible hand writing is desirable for efficient written communication. Often, children do not learn the proper method for grasping a writing instrument, holding the instrument too tightly and/or pressing too hard; the incorrect positioning of the fingers and/or maintaining an improper angle of the pen or pencil make it difficult to learn correct penmanship techniques.

There have been many attempts as far back as the late 1800s to provide a device to assist in improving penmanship. U.S. Pat. No. 244,172, which issued Jul. 12, 1881, discloses a device consisting of a nickel plated wire frame having two loops and a projecting rest, the loops being connected by a brace that lies beneath the third and fourth fingers. The rest does not obstruct the free use of the hand, but if the hand is turned too much to the right, the rest strikes the paper or table, attracting the attention of the user, reminding him that an improper position has been assumed.

U.S. Pat. No. 705,920, which issued Jul. 29, 1902, discloses a device which slides over the user's index finger to keep it in the proper orientation when writing, such that a strain is produced over the finger joint when the finger is bent so that the user feels a certain amount of discomfort and is compelled to bring the finger back to its proper position.

U.S. Pat. No. 751,542, which issued Feb. 9, 1904, describes a device which consists of a large ring adapted to be placed around the middle joint of the forefinger, a smaller ring attached to the large ring adapted to be placed around a pen holder, and a strip provided with a curved end attached to the large ring. The device keeps the middle joint close to the writing instrument, preventing the forefinger from being moved too near the point.

U.S. Pat. No. 1,212,034, which issued Jan. 9, 1917, teaches a device having a spring clasp for holding writing implements of various sizes and arms which embrace the hand, which serve to restrain improper finger movement and keeping the correct position, with the index and second fingers outstretched along the implement.

U.S. Pat. No. 1,402,319 which issued Jan. 3, 1922, teaches a device having two endwise adjustable leaf springs forming a strap for application around the fingers at their base with the palm to provide correct positioning of the fingers while occupied in writing.

U.S. Pat. No. 1,607,775, which issued Nov. 23, 1926, is directed to an aid to teaching writing. The device uses a clip adapted to fit over the first joint of the thumb and hold that joint in the proper positioning for correct penmanship.

U.S. Pat. No. 1,776,094, which issued Jul. 9, 1928, teaches a stem having wings extending therefrom which engage the face of the thumb, preventing a bending of the first joint of the thumb and requiring the user to move the hand, preventing the flexing and unflexing of the fingers and cramping of the hand.

U.S. Pat. No. 1,702,660, which issued Mar. 29, 1928, teaches a device having a sleeve designed to be pushed over the index finger and serving as a carrier for an S shaped clamp which supports the fingers and thumb to positively guide the writing implement.

U.S. Pat. No. 1,783,657, which issued Apr. 19, 1930, teaches a device for retaining the fingers in the proper position of the used in writing and in teaching the method of penmanship known as the "Palmer" method. The device includes an elongated substantially tubular body which is flat on the top and a strap member for receiving the thumb and index finger at one end and the third and fourth fingers at the other end.

U.S. Pat. No. 3,947,977, which issued on Apr. 6, 1976, teaches a pencil holder device having a three dimensional body molded to position the palm, index finger and thumb of the user for teaching proper penmanship.

U.S. Pat. Nos. 4,526,547; 4,689,020; and 4,832,604, which were all invented by a single person, disclose a device having a central bore for receiving a writing instrument and an exterior. The exterior includes a first gripping surface positioned for receiving the user's first finger, a second gripping surface positioned for receiving the user's second finger, and a third gripping surface for receiving the third finger. The surfaces each have an indicia associated with a finger such that the user places the proper one of his fingers on the surface which bears the indicia. Another embodiment describes a device upon which each gripping surface includes a mating material and the user wears a glove having a complementary mating material on three of the fingers such that the user's fingers can be properly placed on the gripping surfaces. This group of patents issued in 1985, 1987, and 1989 respectively.

U.S. Pat. No. 4,846,710, which issued Jul. 11, 1989, teaches an attachment to a writing implement which includes a sleeve dimensioned and configured for engaging the forefinger and an apparatus for securing the sleeve to the associated implement to assist the user in learning the proper position of the fingers for correct penmanship.

U.S. Pat. No. 5,143,463, which issued Sep. 1, 1992, is directed to a device having a small pear shaped body with a cylindrical center hole which has depressions for accepting the thumb, index finger, and the middle finger of the user.

U.S. Pat. No. 5,310,345, which issued May 10, 1994, describes a writing aid for both left and right handed persons, having a central section with a first side and a second opposite side and means which receives and holds an elongated writing instrument between the first and second sides. A first sleeve is attached to the first side defining a finger receiving first pocket and a second sleeve attached to the second side defining a finger receiving second pocket.

U.S. Pat. No. 5,662,423, which issued Sep. 2, 1997, teaches a writing aid which is slidably positioned along the barrel of a writing instrument having a finger retaining strap upon its lower surface.

U.S. Pat. No. 5,980,257, which issued Nov. 9, 1999, describes a device for assisting handwriting training which is comprised of a wristband having an attached string with a charm and pencil loop attached to the wristband. The charm is held within the palm, while the pencil loop serves to place a force of the rear portion of the writing instrument and seat it correctly.

While there is a plethora of devices which address the problem of teaching proper penmanship techniques, each of the devices has one of several shortcomings. For example, some of the devices are designed for right handed users, and cannot be adapted to the left handed student. Also, many of the devices are designed to fit a particular size of writing implement. In addition, a number of the devices are constructed such that the index finger and the middle finger cannot be separated to achieve optimum balance and comfort for the user. Finally, some of the designs need special accessories, such as a glove, in order to use them.

SUMMARY OF THE PRESENT INVENTION

Consequently, a need exists for a device for teaching proper penmanship techniques which overcomes the shortcomings of the prior art in a single device.

It is therefore an object of the present invention to provide a teaching device for penmanship which is adaptable to either a left handed or right handed user.

It is a further object of the present invention to provide a device which is simple and inexpensive to manufacture.

It is a still further object of the present invention to provide a teaching device which is adjustable for different sizes of writing instruments and users' fingers.

These and other objects and advantages of the present invention will be readily apparent from the description that follows.

BRIEF DESCRIPTION OF THE DRAWINGS

FIG. 4 is a plan view of a second component of the device of the present invention;

FIG. 4A is a cross-sectional view of FIG. 4 taken along lines 4A-4A; and

FIG. 5 is a plan view of the component shown in FIG. 3 in place on a writing implement.

DETAILED DESCRIPTION OF THE PREFERRED EMBODIMENTS

Figure 1:
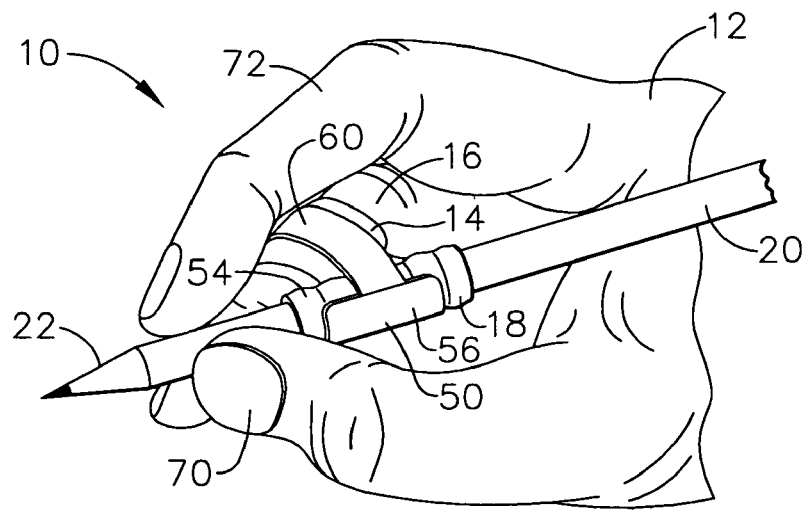
FIG. 1 is a perspective view of the device of the present invention in normal use.

Referring now to FIG. 1, there is shown a teaching device, designated generally at 10, according to the present invention held in the right hand 12 of a person. Teaching device 10 comprises a first component 14 which attaches to the middle finger 16 of the user, and a second component 18 which encircles a writing implement 20 having a writing tip 22.

Figure 2:
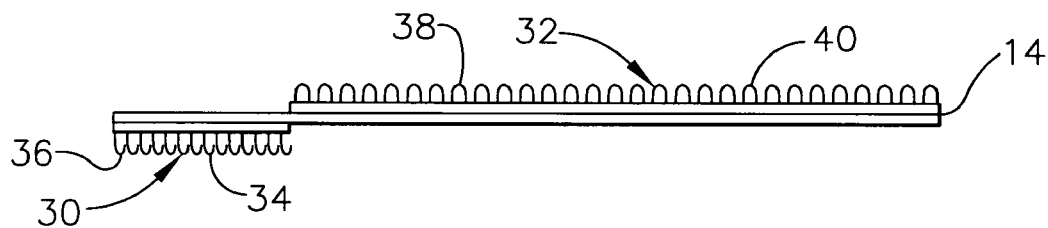
FIG. 2 is a plan view of one component of the device of the present invention.

FIG. 2 shows first component 14 in its unattached state. Component 14 consists of a short section 30 of material which is affixed to a long section 32 of material. Short section 30 contains a mating surface 34 on its underside 36. Mating surface 34 is preferably constructed from tape commonly known as VELCRO® hook and loop fastening material, but can be manufactured from any fastening material which can be releasably attached. In addition, a pressure sensitive material which uses a repositionable type adhesive could be used. Section 32 contains a complimentary mating surface 38 along its upper surface 40, and is attached to section 30 such that mating surfaces 34 and 38 are located on opposite sides of component 14.

Figure 3:
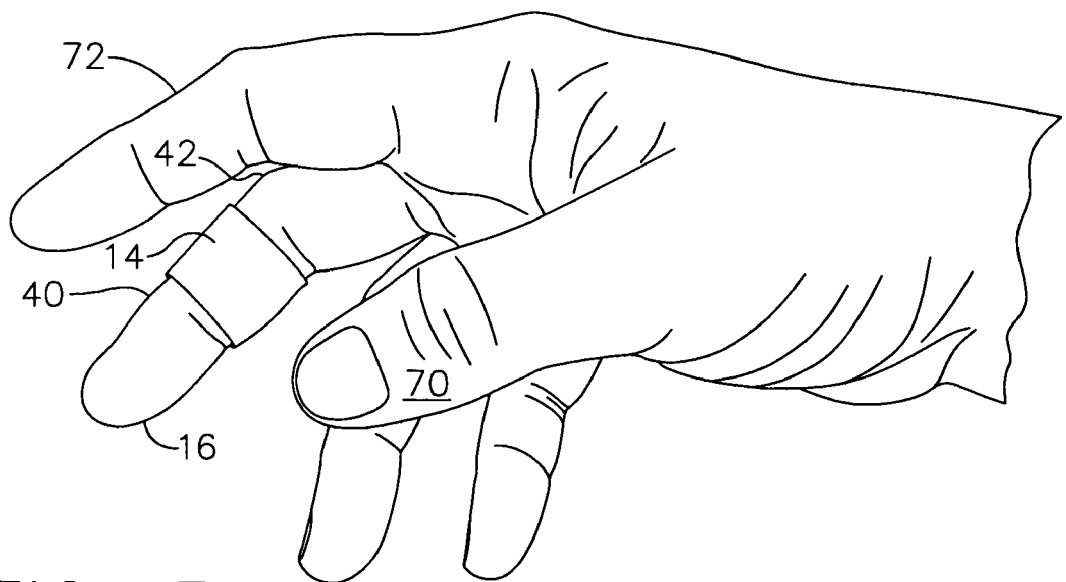
FIG. 3 is a perspective view of the component shown in FIG. 2 in place on the middle finger of a user.

Component 14 is attached to middle finger 16 of a user as shown in FIG. 3. Component 14 is wrapped around finger 16 such that mating surfaces 34 and 38 may be releasably attached to each other. Note that component 14 can be adjusted to fit any size finger, from a young preschool child to a person with unusually thick fingers. Component 14 is preferably located between the first joint 40 and the second joint 42 of middle finger 16.

Component 18 is shown in its unattached state in FIG. 4. A section 50 of material is fastened to an outer side 52 of a flexible cushion 54 in the central area thereof. Outer surface 56 of material section 50 may contain a mating surface 58 which is comprised of a fastening material which can be releasably attached. Cushion 54 is preferably constructed from a soft resilient material like rubber, such as a standard pencil cushion which is split open and uncurled. A typical pen and pencil cushion is sold under the ENABLERS name, and is designed in shape and density to alleviate stress while providing a comfortable, secure grip. The inner surface of cushion 54 is preferably textured such that it will grip the outer surface of writing implement 20 for ease of use.

Attached to material section 50 is a narrow material strip 60 which extends outwardly from cushion 54 as shown in FIG. 4 Strip 60 contains a distal end 60a. The underside 61 of strip 60 contains a mating surface 62. Component 18 is shown mounted on writing implement 20 in FIG. 5. Component 18 is preferably fastened such that there is no slippage between the component and the writing implement.

The use of device 10 can be best seen in FIG. 1. Component 14 is installed in position on middle finger 40 (as seen in FIG. 3). Component 18 is then installed in its working position on implement 20. Cushion 52 has been wrapped lightly around implement 20, and the action between mating surface 62 of strip 60 on component 18 and mating surface 38 of section 32 of component 14 hold component 18 in its proper place. When implement 20 is grasped by the user, this adhesive force holds middle finger 16 in its proper position with respect to implement 20. In addition, the adhesive action between mating surface 56 of material 50 mounted on component 18 and mating surface 38 of component 14 when middle finger 16 is placed in position against cushion 54 of component 18 acts to enhance the grip on implement 20. As thumb 70 and index finger 72 of hand 12 holding implement 20 are placed on cushion 54, implement 20 is now held in the proper position to promote good penmanship. The continued use of device 10 when writing will cause the user to develop a habit of holding a pen or pencil in the correct position for good penmanship.

While the present invention has been shown and described in terms of preferred embodiments thereof, it will be understood that this invention is not limited to any particular embodiment, and that changes and modifications may be made without departing from the true spirit and scope of the invention as defined in the appended claims.

What is claimed is:

1. A device for use in teaching proper penmanship technique, comprising:
    a first component, having a first mating surface on its inner surface and a second mating surface on its outer surface, for releasably encircling the middle finger of a user;
    and a second component, comprising:
    a flexible cushion having an inner surface and an outer surface, with said inner surface adaptable to grip the outer surface of a writing implement,
    a section of material, affixed to the outer surface of said cushion,
    and a strip of material attached to said material section and extending over an edge of said cushion, having a third mating surface;
    wherein when said first component is fastened around the middle finger of a user by releasably attaching said first mating surface to said second mating surface, and said cushion of said second component is positioned to grip the outer surface of a writing implement, said material strip is releasably attached to said first component by the action between said second and third mating surfaces, thereby holding said middle finger of the user against the writing implement in a writing position which promotes proper penmanship.

2. The device of claim 1, wherein said mating surfaces comprise hook and loop tape.

3. The device of claim 1, wherein said mating surfaces comprise a pressure sensitive repositionable type adhesive.

4. The device of claim 1, wherein said cushion is composed of rubber.

5. The device of claim 1, wherein said inner surface of said cushion is textured.

6. The device of claim 1, wherein said material section of said second component contains a fourth mating surface such that when said material strip is releasably attached to said first component, said fourth mating surface of said second component and said second mating surface of said first component are releasably attached, holding the middle finger against the writing implement.

7. A method for teaching proper penmanship technique, comprising the steps of:
    attaching a first component having a first outer mating surface around the middle finger of a user;
    fastening a second component comprising a cushion, having an inner surface and an outer surface, and a section of material, affixed to the outer surface of said cushion and having a second outer mating surface, firmly around a writing implement;
    and gripping the writing implement such that said first mating surface of said first component releasably attaches to said second mating surface of said second component to hold the writing implement which in a writing position promotes proper penmanship.

8. The method of claim 7, further comprising the step of placing the index finger and thumb of the user on said cushion.

9. The method of claim 7, further comprising the step of releasably attaching a strap, extending from said material section of said second component and having a third mating surface along the underside of said strap, to said first mating surface of said first component to enhance gripping of said writing implement by the user.

10. The method of claim 7, wherein said attaching step includes attaching said first component on the middle finger of the user between the first joint and the second joint.

11. A device for use in teaching proper penmanship technique, comprising:
    a first component, having a first mating surface on its inner surface and a second mating surface on its outer surface, for releasably encircling the middle finger of a user;
    and a second component, comprising:
    a flexible cushion having an inner surface and an outer surface, with said inner surface adaptable to grip the outer surface of a writing implement,
    a section of material, affixed to said outer surface of said cushion, having a third mating surface,
    and a strip of material, attached to said material section and extending over an edge of said cushion, having a fourth mating surface;
    wherein when said first component is fastened around the middle finger of a user and said cushion of said second component is positioned firmly around a writing implement, said second mating surface of said first component is releasably attached to said third mating surface of said material section, and also to said fourth mating surface of said strip of said second component such that said middle finger of the user is held in place against the writing implement in a writing position which promotes proper penmanship.

12. The device of claim 11, wherein said mating surfaces comprise hook and loop tape.

13. The device of claim 12, wherein said mating surfaces comprise a pressure sensitive repositionable type adhesive.

14. The device of claim 11, wherein said cushion is composed of rubber.

15. The device of claim 11, wherein said inner surface of said cushion is textured.

16. The device of claim 11, wherein said first component is releasably attached to said middle finger of the user between the first joint and the second joint.

\* \* \* \* \*